(12) United States Patent  
Yamashita et al.

(10) Patent No.: US 9,355,049 B2  
(45) Date of Patent: May 31, 2016

(54) INTERRUPT MONITORING SYSTEM AND COMPUTER SYSTEM

(71) Applicant: FUJITSU LIMITED, Kawasaki-shi, Kanagawa (JP)

(72) Inventors: Koichiro Yamashita, Hachioji (JP); Hiromasa Yamauchi, Usakos (NA); Takahisa Suzuki, Yokohama (JP); Koji Kurihara, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/198,920

(22) Filed: Mar. 6, 2014

(65) Prior Publication Data

US 2014/0189185 A1    Jul. 3, 2014

Related U.S. Application Data

(63) Continuation of application No. PCT/JP2011/071387, filed on Sep. 20, 2011.

(51) Int. Cl.
*G06F 13/32* (2006.01)
*G06F 13/24* (2006.01)
*G06F 9/48* (2006.01)

(52) U.S. Cl.
CPC .............. *G06F 13/24* (2013.01); *G06F 9/4812* (2013.01); *G06F 2209/508* (2013.01)

(58) Field of Classification Search
CPC ...... G06F 13/24; G06F 9/4825; G06F 9/4812
USPC ........... 710/260–269, 240–244, 200; 718/102
See application file for complete search history.

(56) References Cited

U.S. PATENT DOCUMENTS

2005/0246461 A1 * 11/2005 Accapadi et al. ............. 710/200

FOREIGN PATENT DOCUMENTS

| JP | 59-161738 A | 9/1984 | |
|---|---|---|---|
| JP | 59-034361 | * 12/1984 | .......... G06F 9/46 |
| JP | S 63-29853 A | 2/1988 | |
| JP | 05-053836 A | 3/1993 | |
| JP | 05-061694 A | 3/1993 | |
| JP | 05-120199 | * 5/1993 | |
| JP | 05-120199 A | 5/1993 | |
| JP | 06-309180 A | 11/1994 | |
| JP | 10-040117 A | 2/1998 | |

(Continued)

OTHER PUBLICATIONS

International Search Report, Japanese Patent Application No. PCT/JP2011/071387 dated Dec. 27, 2011.

(Continued)

*Primary Examiner* — Tim T Vo
*Assistant Examiner* — Kim T. Huynh
(74) *Attorney, Agent, or Firm* — Arent Fox LLP

(57) ABSTRACT

An interrupt monitoring apparatus includes a storage that stores a given threshold that corresponds to an external interrupt notification; a measuring circuit that measures time that elapses from a time when the external interrupt notification is received until a time when dispatch notification is received from a CPU; a comparing circuit that compares the given threshold and the time measured by the measuring circuit; and an output circuit that outputs to the CPU, a comparison result obtained by the comparing circuit.

3 Claims, 8 Drawing Sheets

(56) References Cited

FOREIGN PATENT DOCUMENTS

| | | |
|---|---|---|
| JP | 11-237995 A | 8/1999 |
| JP | 2010-140239 A | 6/2010 |

OTHER PUBLICATIONS

Japanese Office Action for Japanese Application No. 2013-534487 dated Apr. 7, 2015 (partial translation of relevant portion)I.

* cited by examiner

INTERRUPT MONITORING SYSTEM AND COMPUTER SYSTEM

CROSS REFERENCE TO RELATED APPLICATIONS

This application is a continuation application of International Application PCT/JP2011/071387, filed on Sep. 20, 2011 and designating the U.S., the entire contents of which are incorporated herein by reference.

FIELD

The embodiments discussed herein are related to an interrupt monitoring system and a computer system that monitor interrupts.

BACKGROUND

Conventionally, in embedded systems such as mobile terminals, real-time operating systems (OSs) have been adopted as OSs capable of real-time control. However, in recent years, the adoption of universal OSs, which have an advantage in terms of development costs, has been on the rise. Universal OSs do not perform real-time control and therefore, do not guarantee interrupt response.

As a technique of guaranteeing interrupt response, one approach monitors the time from interrupt notification until interrupt handler completion, and increases the processing priority level of threads for which the response is slow (for example, refer to Japanese Laid-Open Patent Publication No. S59-161738).

Nonetheless, with the conventional techniques above, if the load of the central processing unit (CPU) increases, the monitoring of the response time for interrupt processing is delayed, arising in a problem that real-time processing fails. Further, in the system, if a thread that has been set to have the highest priority level is delayed, the priority level cannot be further increased and real-time processing fails.

SUMMARY

According to an aspect of an embodiment, an interrupt monitoring apparatus includes a storage is configured to store a given threshold that corresponds to an external interrupt notification; a measuring circuit configured to measure time that elapses from a time when the external interrupt notification is received until a time when dispatch notification is received from a CPU; a comparing circuit configured to compare the given threshold and the time measured by the measuring circuit; and an output circuit configured to output to the CPU, a comparison result obtained by the comparing circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of an interrupt monitoring system and a computer system will be described in detail with reference to the accompanying drawings.

Figure 1:
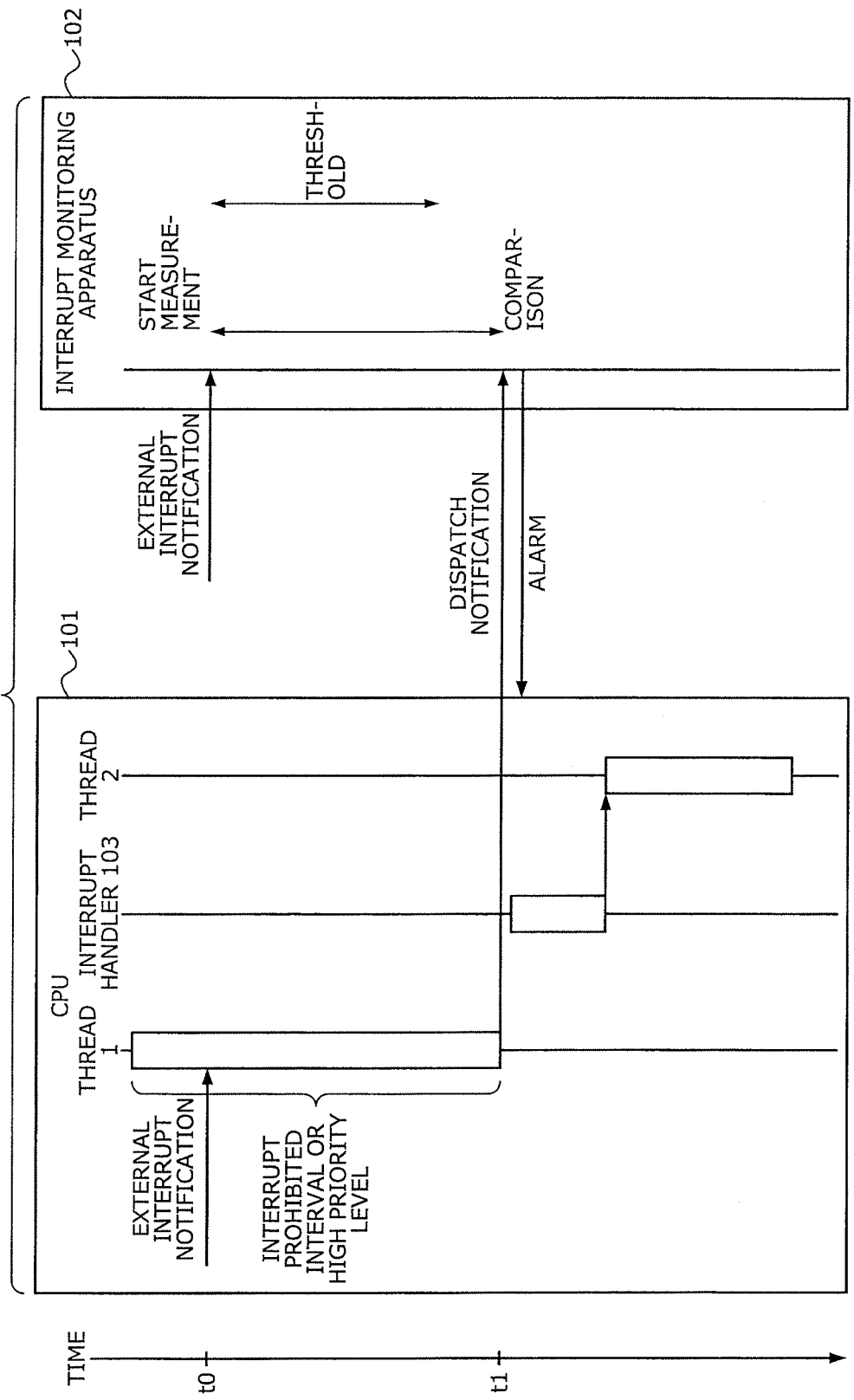
FIG. 1 is a diagram depicting an operation example of a computer system.

FIG. 1 is a diagram depicting an operation example of a computer system. A computer system 100 includes a CPU 101 that controls threads that have been executed from a memory area of, for example, the memory, and an interrupt monitoring apparatus 102. The CPU 101 employs a universal OS, as an OS that controls the computer system 100, and executes thread 1 and thread 2 as the threads. Thread 1 is a thread for which an interrupt prohibited interval or a high priority level has been set. Thread 2 is a thread that executes a process that corresponds to an external interrupt notification. External interrupt notification is an interrupt signal from a device in the computer system 100. The interrupt monitoring apparatus 102 is an apparatus that measures the time from the external interrupt notification until a CPU dispatch notification, and detects interrupt process delays.

At time t0, the CPU 101 and the interrupt monitoring apparatus 102 receive an external interrupt notification from a device. At time t0, the CPU 101 is executing thread 1. The universal OS, according to priority level-based scheduling, switches threads without performing control of the timing at which the thread is switched. Having received the external interrupt notification, the interrupt monitoring apparatus 102 begins measurement.

At time t1, if thread 1 under execution by the CPU 101 is switched to an interrupt handler 103 that causes execution of thread 2, which corresponds to the external interrupt notification, the CPU 101 transmits dispatch notification to the interrupt monitoring apparatus 102. The interrupt monitoring apparatus 102 having received the dispatch notification, compares a period from time t0 when the external interrupt notification is received until the current time t1 and a given threshold, which is a response period that is permitted by the device. In the example depicted in FIG. 1, since the period from time t0 until time t1 is greater than the given threshold, the interrupt monitoring apparatus 102 outputs an alarm.

Thus, since the CPU 101 receives an alarm when the response period permitted by the device has been exceeded, a lowering of the priority level of thread 1 enables real-time processing to be guaranteed. The interrupt monitoring apparatus 102 will be described in detail with reference to FIGS. 2 to 7.

Figure 2:
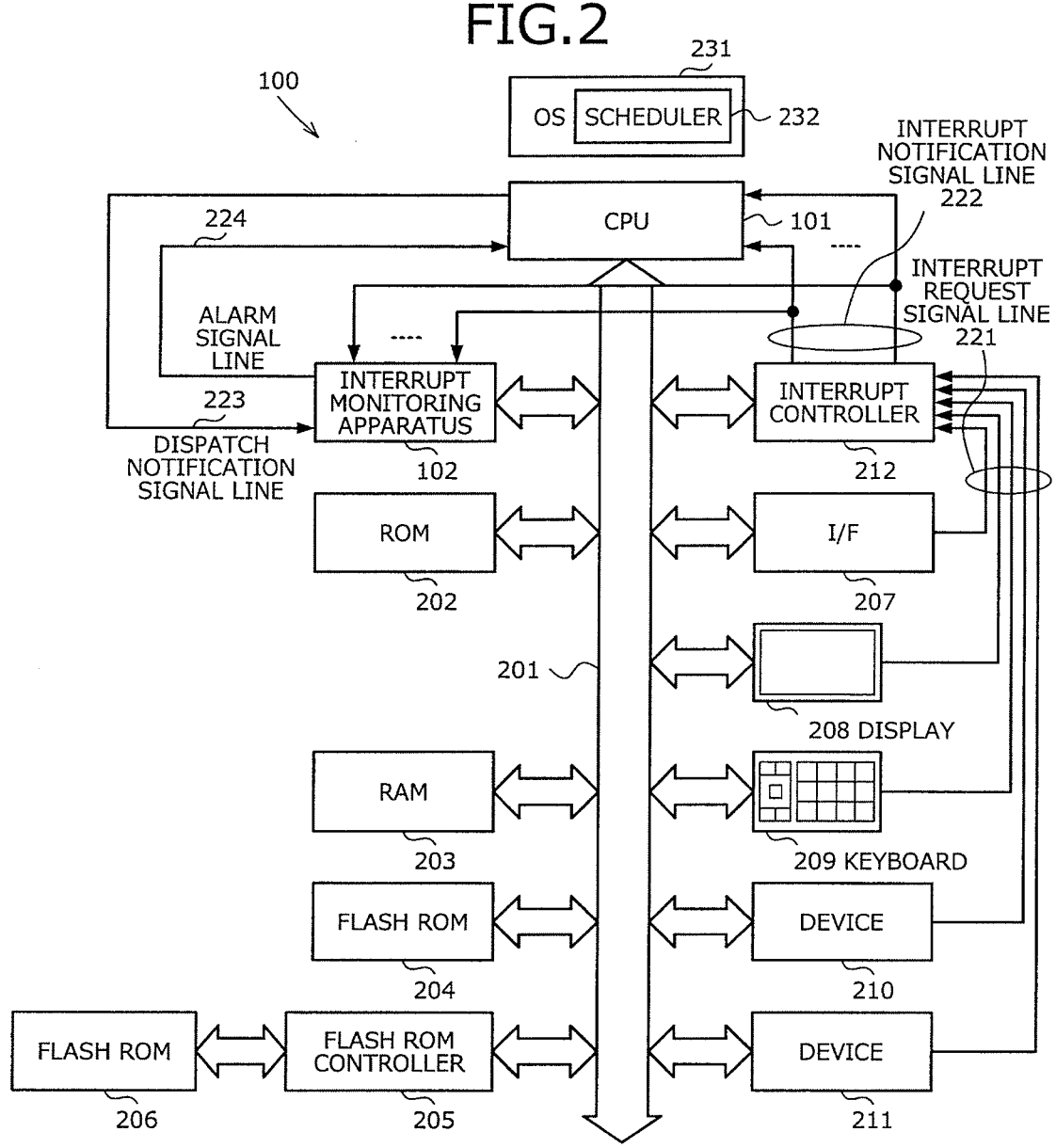
FIG. 2 is a block diagram of a hardware example of the computer system.

FIG. 2 is a block diagram of a hardware example of the computer system. In the present embodiment, the computer system 100 is assumed to be a mobile terminal, such as mobile telephone. As depicted in FIG. 2, the computer system 100 includes the CPU 101, read-only memory (ROM) 202, and random access memory (RAM) 203.

The computer system 100 includes flash ROM 204, a flash ROM controller 205, and flash ROM 206. The computer system 100 includes, as input/output apparatuses for the user and/or other devices, an interface (I/F) 207, a display 208, and a keyboard 209. The computer system 100 further includes a device 210, a device 211, an interrupt controller 212, and the interrupt monitoring apparatus 102. The respective components of the computer system 100 are connected by a bus 201.

The CPU 101 governs overall control of the computer system 100. The computer system 100 may be a multi-core processor system having the CPU 101 in plural. A multi-core processor is a processor that is equipped with plural cores. The multiple cores may be provided as a single processor equipped with multiple cores or a group of single-core processors connected in parallel.

For example, the CPU 101 executes an OS 231 and governs the overall control of the computer system 100. The OS 231 is assumed to be a universal OS that gives no consideration to real-time processing. The OS 231 includes a scheduler 232 that has a function of assigning threads to CPUs. The CPU 101 is connected to the interrupt monitoring apparatus 102 via a dispatch notification signal line 223 and an alarm signal line 224. The CPU 101 transmits dispatch notification via the dispatch notification signal line 223, each time dispatching occurs.

The ROM 202 stores programs such as a boot program. The RAM 203 is used as work area of the CPU 101. The flash ROM 204 is flash ROM having a high read out speed and, for example, is NOR flash memory. For example, the flash ROM 204 stores system software such as the OS 231 and application software. For example, when the OS 231 is updated, the computer system 100 receives the new OS 231 via the I/F 207 and updates the old OS 231 stored in the flash ROM 204 with the new OS 231.

The flash ROM controller 205, under the control of the CPU 101, controls the reading and writing of data with respect to the flash ROM 206. The flash ROM 206 is flash ROM that stores data, has a primary purpose of portability, and may be, for example, NAND type flash ROM. The flash ROM 206 stores data written thereto under the control of the flash ROM controller 205. Examples of the data include image data and video data acquired by the user of the computer system 100 through the I/F 207, as well as a program that executes the thread processing method according to the present embodiment. A memory card, SD card and the like may be adopted as the flash ROM 206.

The I/F 207 is connected to a network such as a local area network (LAN), a wide area network (WAN), and the Internet through a communication line and is connected to other apparatuses through the network. The I/F 207 administers an internal interface with the network and controls the input and output of data with respect to external apparatuses. For example, a modem or a LAN adaptor may be employed as the I/F 207.

The display 208 displays, for example, data such as text, images, functional information, etc., in addition to a cursor, icons, and/or tool boxes. A thin-film-transistor (TFT) liquid crystal display and the like may be employed as the display 208.

The keyboard 209 includes, for example, keys for inputting letters, numerals, and various instructions and performs the input of data. Alternatively, a touch-panel-type input pad or numeric keypad, etc. may be adopted.

The device 210 and the device 211 are peripheral apparatuses exclusive of the ROM 202 to the keyboard 209. Examples of devices provided on the mobile terminal include a camera device, a GPS device, and the like.

The interrupt controller 212 receives via an interrupt request signal line 221, interrupt signals from apparatuses such as the I/F 207 to the device 211; and via an interrupt notification signal line 222, sends interrupt signals to the CPU 101 and the interrupt monitoring apparatus 102. Further, the number of the interrupt request signal line 221 and the interrupt notification signal line 222 is equivalent to the number of apparatuses that output an interrupt signal. For example, assuming n is an integer of 1 or more, the interrupt request signal line 221 is present as the interrupt request signal lines 221-1 to 221-n; and the interrupt notification signal line 222 is present as the interrupt notification signal lines 222-1 to 222-n.

The interrupt monitoring apparatus 102 is an apparatus that monitors interrupts. For example, based on an interrupt notification signal from the interrupt controller 212 and a dispatch notification signal from the CPU 101, the interrupt monitoring apparatus 102 outputs to the alarm signal line 224 indication of whether an interrupt process delay is occurring. The interrupt monitoring apparatus 102 will be described in detail with reference to FIG. 3.

Figure 3:
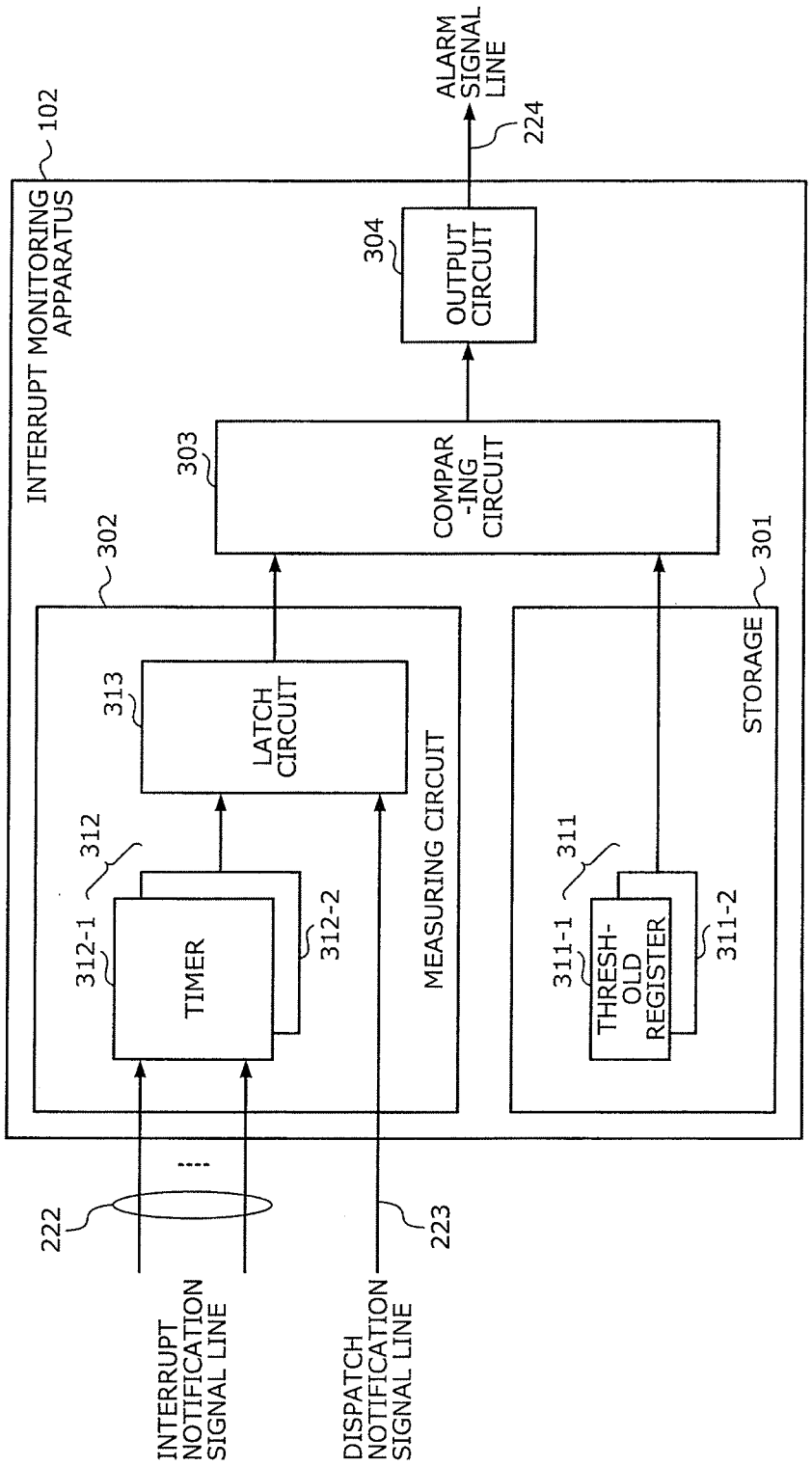
FIG. 3 is a diagram depicting a hardware example of an interrupt monitoring apparatus.

FIG. 3 is a diagram depicting a hardware example of the interrupt monitoring apparatus. The interrupt monitoring apparatus 102 includes storage 301, a measuring circuit 302, a comparing circuit 303, and an output circuit 304. The storage 301 includes threshold registers 311. The measuring circuit 302 includes timers 312 and a latch circuit 313.

The threshold registers 311 are registers that store thresholds for the start of the interrupt handler 103 of a device. The threshold registers 311 are registers that can be set by the CPU 101. The number of the threshold registers 311 provided may be equivalent to the number of the interrupt notification signal lines 222.

The timers 312 start measuring the time that elapses after receipt of external interrupt notification from the interrupt notification signal line 222 and continues the measurement until measurement termination notification is received from the latch circuit 313. The number of the timers 312 provided may be equivalent to the number of the interrupt notification signal lines 222.

The latch circuit 313, upon receiving dispatch notification from the CPU 101, notifies the timers 312 of measurement termination, and notifies the comparing circuit 303 of the result of measuring the time from the external interrupt notification until the dispatch notification.

The storage 301 has a function of storing a given threshold corresponding to an external interrupt notification. For example, the storage 301 stores the given threshold in the threshold registers 311. The storage 301 may store a given threshold for each external interrupt notification. For example, the threshold register 311-1 stores a threshold that corresponds to an interrupt notification from the I/F 207; the threshold register 311-2 stores a threshold that corresponds to an interrupt notification from the display 208.

The measuring circuit 302 has a function of measuring the time that elapses from the time of receipt of an external interrupt notification until the time of receipt of a dispatch notification from the CPU 101. The measuring circuit 302 may be configured to measure the time that elapses from the time of receipt of any one of the external interrupt notification until the time of receipt of a dispatch notification from a CPU.

For example, upon receiving an external interrupt notification from the interrupt notification signal line 222, the measuring circuit 302 activates the timers 312. Further, number of the timers 312 provided may be equivalent to the number of the interrupt notification signal lines 222. For example, if the I/F 207 transmits an external interrupt notification via the interrupt notification signal line 222-1, the timers 312 that have received the external interrupt notification start up and begin measuring the time that elapses. Subsequently, upon receiving a dispatch notification from the CPU 101, the measuring circuit 302 obtains the measured time.

Dispatch notification from the CPU 101 is given each time dispatching occurs. Therefore, until external interrupt notification is received and even if dispatch notification is received, the measuring circuit 302 does nothing, receives the external interrupt notification and measures the time that elapses until the next dispatch notification.

The comparing circuit 303 has a function of comparing a given threshold and the time measured by the measuring circuit 302. For example, if the given threshold is 16.5 [msec] and the measured time is 18 [msec], the comparing circuit 303 compared the magnitudes of 16.5 and 18.

The output circuit 304 has a function of outputting to the CPU 101, a comparison result obtained by the comparing circuit 303. For example, when the measured time is greater than a threshold, the output circuit 304 outputs an alarm as the comparison result; and when the measured time is less that the threshold, the output circuit 304 cancels the alarm output, as the comparison result.

Figure 4:
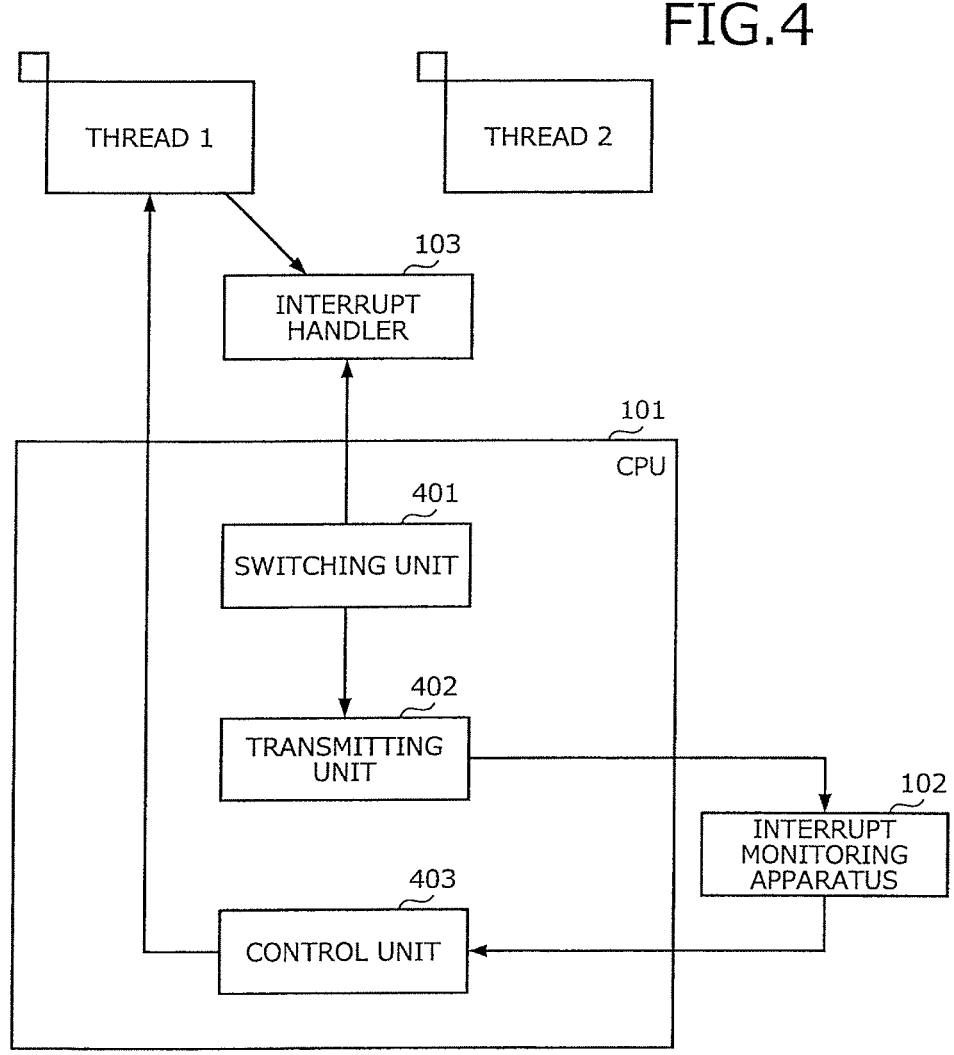
FIG. 4 is a block diagram of an example of functions of the computer system.

Functions of the computer system 100 will be described. FIG. 4 is a block diagram of an example of functions of the computer system. The computer system 100 includes a switching unit 401, a transmitting unit 402, and a control unit 403. These functions (the switching unit 401 to the control unit 403) forming a control unit, are implemented by executing on the CPU 101, a program stored in a storage apparatus. The storage apparatus is, for example, the ROM 202, the RAM 203, the flash ROM 204, and the flash ROM 206 depicted in FIG. 2.

The switching unit 401 has a function of switching a process (a first thread among a group of threads) that is under execution by a control apparatus, to the interrupt handler 103, which causes a second thread to be executed that corresponds to an external interrupt notification. In the present example, the control apparatus is an apparatus that includes the CPU 101 and a storage apparatus such as the ROM 202 and the RAM 203. For example, the switching unit 401 switches thread 1 to the interrupt handler 103, which causes thread 2 to be executed.

The transmitting unit 402 has a function of transmitting dispatch notification to the interrupt monitoring apparatus 102, when a process under execution is the first thread and is switched to the interrupt handler 103. For example, when thread 1 has been switched to the interrupt handler 103, the transmitting unit 402 transmits dispatch notification to the interrupt monitoring apparatus 102.

The control unit 403 has a function of controlling the priority level of the first thread, when a comparison result has been received from the interrupt monitoring apparatus 102. Further, the control unit 403 may lower the priority level of the first thread, when the comparison result from the interrupt monitoring apparatus 102 indicates that the measured time is greater than the given threshold. For example, the control unit 403 lowers the priority level of thread 1, upon receiving an alarm indicating that the measured time is greater than the given threshold.

The control unit 403 restores the priority level of the first thread, upon receiving from the interrupt monitoring apparatus 102, a comparison result indicating that the measured time is less than the given threshold. For example, the control unit 403 restores the priority level of thread 1, upon receiving an alarm cancellation indicating that the measured time is less than the given threshold.

Figure 5:
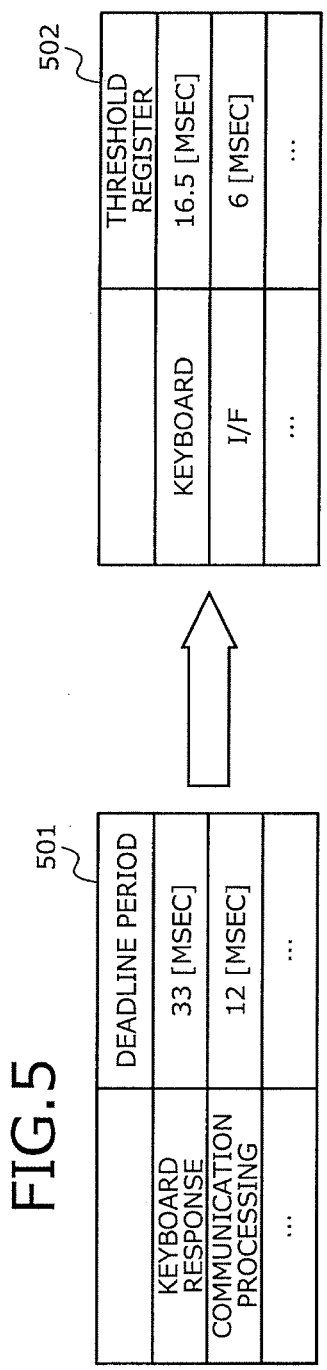
FIG. 5 is a diagram depicting a setting example of threshold registers.

FIG. 5 is a diagram depicting a setting example of the threshold registers. In FIG. 5, a table 501 depicts an example of deadline periods for the I/F 207 to the device 211; table 502 depicts an example of values set in the threshold registers.

As depicted in table 501, the computer system 100 is designed to have, as a response period acceptable to the user, a deadline period of 33 [msec] for performing a keyboard response. Further, the computer system 100 is designed to have, as period enabling guarantee of the quality of service (QoS) of communication, a deadline period of 12 [msec] for communication processing.

In this case, if a deadline period is set in a threshold register as is, the deadline period is exceeded and therefore, a period shorter than the deadline period is preferably set. For example, the computer system 100 may set, for a threshold register of the keyboard 209, a period that is an integral multiple of the deadline period or a fraction thereof.

In the example depicted in table 502, the computer system 100 sets the threshold register of the keyboard 209 to a fraction of ½ of the deadline period, i.e., 33×½=16.5 [msec]. For the I/F 207 as well, the computer system 100 sets the threshold register of the I/F 207 to 12×½=6 [msec]. A suitable timing at which the setting is made for a setting register of the keyboard 209, is when an application that performs key operation is activated, for example.

Thus, by setting threshold registers to integral multiples of or fractions of deadlines determined at the time of design, the computer system 100 can improve operability for the user. Here, as an example, the reason why setting an integral multiple of or a fraction of the deadline of the keyboard 209 results in a response period that is acceptable to the user will be described. The deadline period of the keyboard 209 is set based on the refresh rate of the display 208. If the refresh rate of the display 208 is 30 [Hz], the screen is updated once about every 33 [msec].

In this case, if the threshold register is set to 25 [msec], which is neither an integral multiple of nor a fraction of the deadline period, when the screen is updated 1 time, there are occasions when an interrupt of the keyboard 209 is obtained 2 times and when the interrupt is obtained 1 time. For example, if the user quickly presses a given key on the keyboard 209 twice, there are occasions where the displayed screen reflects a state where the given key has been pressed twice and where the screen reflects a state where the given key has been pressed once and with the next updating of the screen, reflects the state where the given key has been pressed twice.

Thus, if the threshold register is not set to an integral multiple of or a fraction of the response time of the device, in some instances, the computer system 100 yields different operation results, despite the user performing the same operation. By setting the threshold register to an integral multiple of or a fraction of the response time of the device, the number of times that an interrupt of the keyboard 209 is received is consistent and therefore, the computer system 100 can improve operability for the user.

Figure 6:
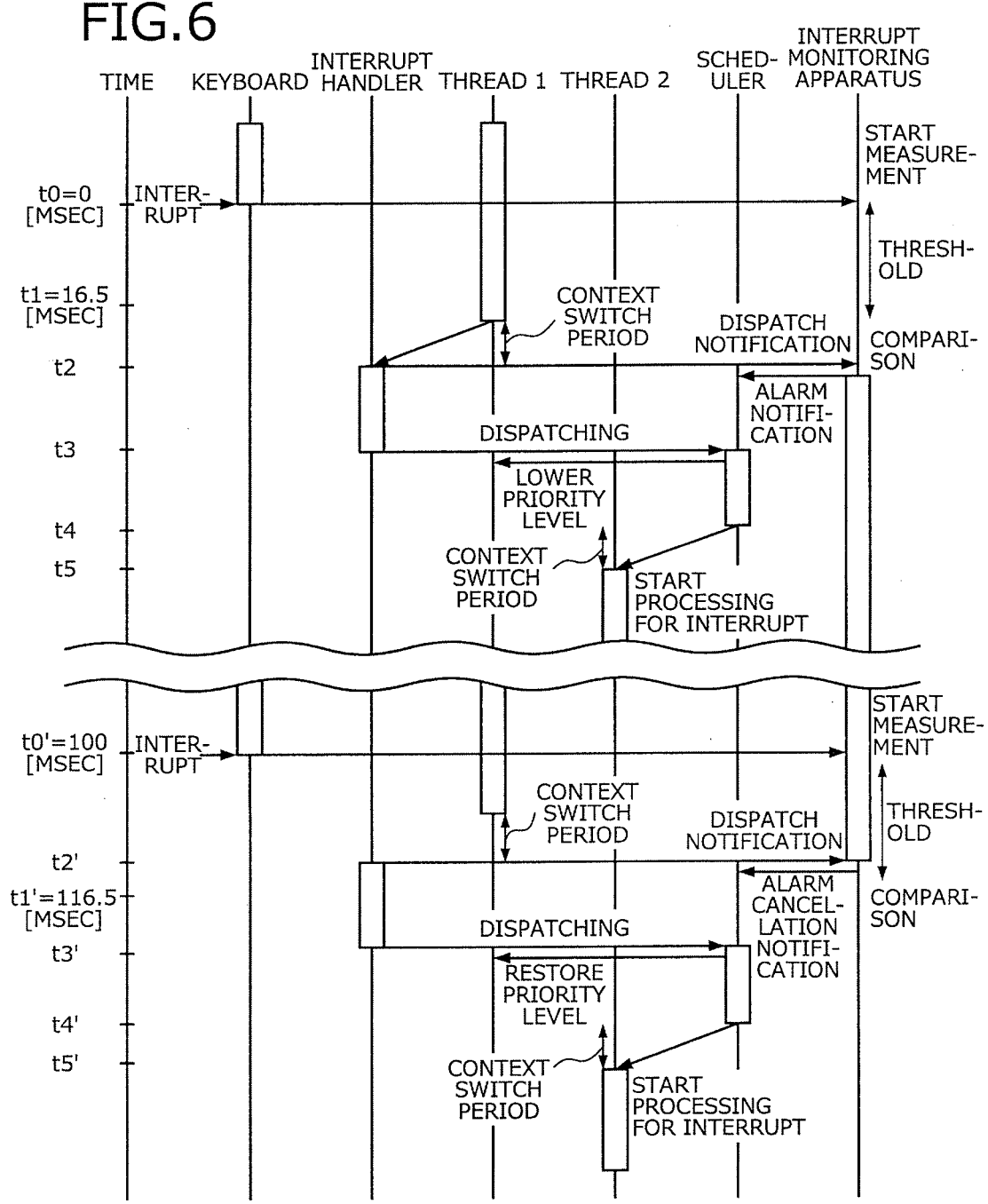
FIG. 6 is a diagram depicting an example of a timing chart of operations of the interrupt monitoring apparatus.

FIG. 6 is a diagram depicting an example of a timing chart of operations of the interrupt monitoring apparatus. FIG. 6 depicts a timing chart of operations of the interrupt monitoring apparatus 102 for an interrupt of the keyboard 209. In FIG. 6, thread 1 is assumed to be a download app that operates with high priority; thread 2 is assumed to be a browser that receives input from the user. At times t0 to t5, operation of the interrupt monitoring apparatus 102 outputting an alarm is depicted; and at times t0' to t5', operation of the interrupt monitoring apparatus 102 cancelling the alarm is depicted.

At time t0=0 [msec], the CPU 101 is executing thread 1 and an interrupt of the keyboard 209 occurs consequent to a user operation. The interrupt monitoring apparatus 102, via the interrupt notification signal line 222, receives external interrupt notification and begins measurement.

The CPU 101 ends the processing of thread 1 at time t2 after a context switch period, and executes the interrupt handler 103. Time t2 is a point in time at the threshold t1=16.5 [msec] of the keyboard 209 or thereafter. At time t2, since dispatching is started, the CPU 101 transmits, via the scheduler 232, dispatch notification to the interrupt monitoring apparatus 102. Although the dispatch notification occurs at a time before time t0, the measuring circuit 302 does not start measurement until an external interrupt notification has been received.

A state where the threshold has been exceeded is a phenomenon particular to a universal OS and easily occurs when plural tasks or threads are consolidated and each task or thread has a different priority level. A configuration incorporating shared memory and shared bus unique to an embedded system-on-a-chip (SoC) is known to duplicate such a phenomenon.

The phenomenon unique to a universal OS occurs consequent to systems that include software mutually interfering and resulting in a phenomenon where the dispatch timing of the OS 231 causes the setting time of the OS 231 to deviate. When the OS 231 is a real-time OS, without consideration of complicated systems such as those that mutually interfere with one another, designer-intended scheduling can be performed where all of the real-time threads are switched at the timings given thereto. Nonetheless, since the OS 231 of the present embodiment is assumed to be a universal OS, scheduling is performed where apps are scheduled by priority level and addressing mutual interference occurring after the scheduling is beyond the scope of design.

Since the measured time is greater than the threshold, after receiving dispatch notification, the interrupt monitoring apparatus 102 sends an alarm to the CPU 101. At time t3, after the process of the interrupt handler 103 has ended, the CPU 101, via the scheduler 232, lowers the priority level of thread 1 executed before the dispatching. At time t4, the CPU 101 starts a process in response to the external interrupt notification; and at time t5, which is after the context switch period has elapsed, the CPU 101 executes thread 2.

Thus, a temporary lowering the high-priority level of thread 1 temporarily changes the load balance of the computer system 100. Even if mutual interference of apps in a complicated system occurs, a lowering of the priority level shortens the CPU time given to 1 thread, whereby the dispatch intervals are shortened. When the dispatch intervals are shortened, the CPU 101 is able to easily receive interrupt notifications equivalent to the amount by which the dispatch intervals are shortened.

This phenomenon is also unique to a universal OS because when an interrupt occurs, in the interrupt processing, a flag is set to an interrupt vector on OS and the flag is checked at the timing of the thread switching by the dispatching, whereby interrupt handling processing is performed.

At time t0'=100 [msec], the CPU 101 is executing thread 1 and an interrupt of the keyboard 209 occurs consequent to a user operation. The interrupt monitoring apparatus 102 receives notification via the interrupt notification signal line 222, and starts measurement. At time t0', the priority level of thread 1 is still in the lowered state.

The CPU 101 ends the process of thread 1, and at time t2' after the context switch period, the CPU 101 executes the interrupt handler 103. Time t2' is a time before the threshold t1'=116.5 [msec] of the keyboard 209. At time t2', since dispatching has started, the CPU 101 transmits, via the scheduler 232, dispatch notification to the interrupt monitoring apparatus 102.

Since the measured time is greater than the threshold, after receiving the dispatch notification, the interrupt monitoring apparatus 102 sends an alarm cancellation to the CPU 101. At time t3', after the interrupt handler 103 has ended, the CPU 101, via the scheduler 232, restores the priority level of thread 1 executed before the dispatching. At time t4', the CPU 101 starts a process corresponding to the external interrupt notification; and at time t5' after the context switch period has elapsed, the CPU 101 executes thread 2. Thus, when the alarm is cancelled, the scheduler 232 returns the priority level of the thread to the usual priority level, whereby the expected operation state can be restored.

Figure 7:
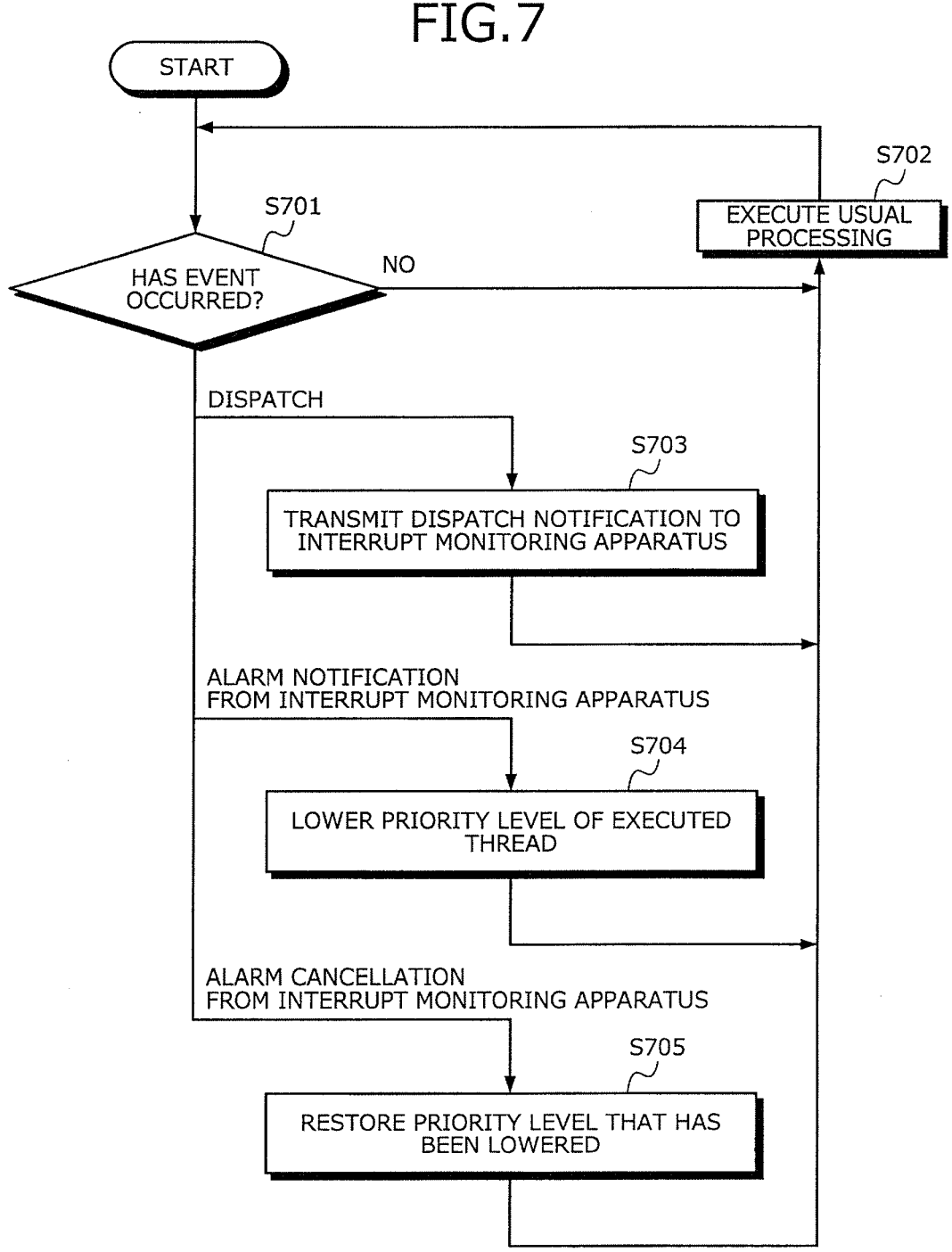
FIG. 7 is a flowchart depicting an example of an interrupt monitoring process.

FIG. 7 is a flowchart depicting an example of an interrupt monitoring process. The interrupt monitoring process may be executed by the OS 231 or by the scheduler 232. If the OS 231 executes the interrupt monitoring process, the OS 231 receives dispatch notification from the scheduler 232. If the scheduler 232 executes the interrupt monitoring process, the scheduler receives from the OS 231, the alarm that is from the interrupt monitoring apparatus 102. In the example depicted in FIG. 7, the scheduler 232 is assumed to execute the interrupt monitoring process.

The scheduler 232 confirms whether an event has occurred (step S701). If no event has occurred (step S701: NO), the scheduler 232 executes usual processing (step S702). The usual processing is a process that the scheduler 232 usually performs such as thread dispatch according to priority level. After executing the usual processing, the scheduler 232 proceeds to step S701.

If dispatch has occurred (step S701: DISPATCH), the scheduler 232 transmits dispatch notification to the interrupt monitoring apparatus 102 (step S703), and proceeds to step S702.

If alarm notification from the interrupt monitoring apparatus 102 has occurred (step S701: ALARM NOTIFICATION FROM INTERRUPT MONITORING APPARATUS), the scheduler 232 lowers the priority level of the executed thread (step S704). After lowering the priority level, the scheduler 232 proceeds to step S702. If alarm cancellation from the interrupt monitoring apparatus 102 has occurred (step S701: ALARM CANCELLATION FROM INTERRUPT MONITORING APPARATUS), the scheduler 232 restores the priority level that has been lowered (step S705), and proceeds to step S702.

The interrupt monitoring process may be distributed between and performed by the OS 231 and the scheduler 232. For example, the scheduler 232 detects the occurrence of dispatching and executes the operation at step S703; the OS 231 detects the occurrence of an alarm and executes the operations at steps S704 and S705.

Figure 8:
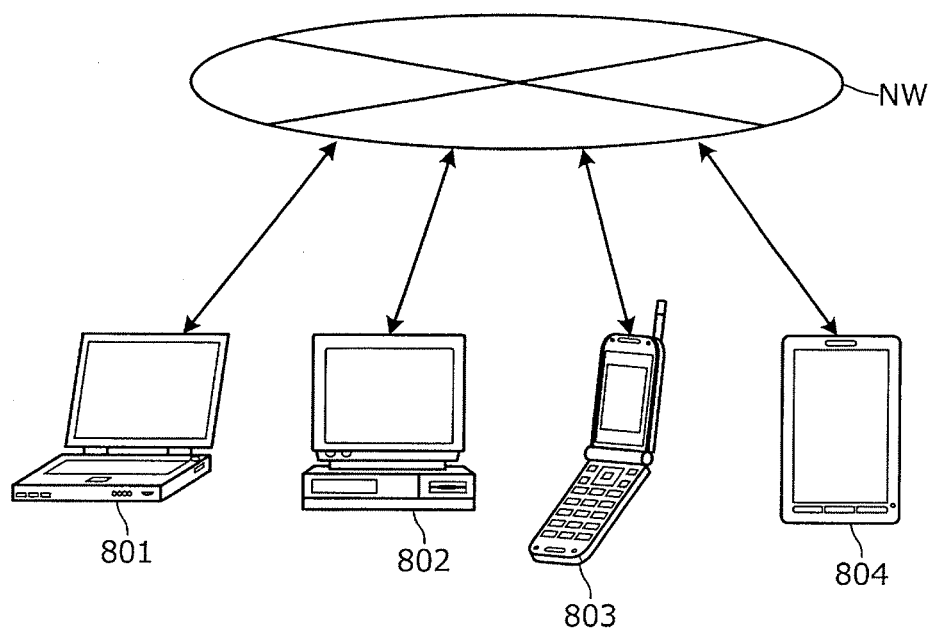
FIG. 8 is a diagram depicting an example of application of the computer system according to an embodiment.

FIG. 8 is a diagram depicting an example of application of the computer system according to the present embodiment. An application example of a system that uses the computer according to the present embodiment is depicted. In FIG. 8, a network NW is a network in which computer systems 801 to 804 can communicate and, for example, includes LANs, WANs, the Internet, mobile telephone networks, and the like.

The computer system 801 is a notebook personal computer (PC). The computer system 802 is a desktop PC; and the computer system 803 is a mobile telephone. As a mobile telephone, the computer system 803 may be a smartphone, a personal handyphone system (PHS) device, etc. The computer system 804 is a table terminal. The computer systems

801 to 804 depicted in FIG. 8 performs the interrupt monitoring according to the present embodiment.

As described, according to the interrupt monitoring apparatus, the response period of interrupt processing is measured by an entity other than the CPU, from the time of an external interrupt from a device and the time of dispatch notification from CPU. Thus, interrupt monitoring apparatus, without affecting the load on the CPU, is able to detect interrupt process delay and provide guarantee of real-time processing. Further, the interrupt monitoring apparatus can provide favorable response performance with respect to user manipulation of a keyboard, touch panel, etc. of a high-performance terminal equipped with a universal OS.

The interrupt monitoring apparatus, for each external interrupt notification from plural devices, may measure the time that elapses from the time when an external interrupt notification among the external interrupt notifications is received, until the time when dispatch notification from the CPU is received. When devices equipped with the computer system are present in large numbers and external interrupt notification is received from a large number of the devices, cases where threads performing interrupt processing interfere with one another and the load of the CPU increases can be expected. However, even in such a case, the interrupt monitoring apparatus, without affecting the increased CPU load, cane detect interrupt process delay and guarantee real-time processing.

For example, in the computer system according to the present embodiment, in a state where the user manipulates a browser and even if the load of high-priority download software increases, interrupt process delay is detected, the priority level of the download software is temporarily lowered, and the responsiveness is maintained. In a conventional computer system, consequent to an increase of the load of the download software, delay cannot be detected and operational responsiveness remarkably drops. Alternatively, in a conventional computer system, by setting the priority level high on the browser side, download communication is timed-out, and other disadvantages related to operational responsiveness occur.

The computer system according to the present embodiment, upon receiving an alarm from the interrupt monitoring apparatus, may control the priority level of a thread before switching. As a result, the computer system, with respect to the interrupt process delay measured by an entity other than the CPU, the thread causing the delay can be identified and by further controlling the priority level, real-time processing can be guaranteed. For example, upon receiving an alarm, the computer system lowers the priority level of the thread before the thread is subject to switching, whereby the rate at which the thread after switching is assigned to CPUs increases and as a result, real-time processing can be guaranteed. The computer system, upon receiving an alarm cancellation, restores the priority level of the thread before switching and thereby, enables restoration of the operation state expected by the designer.

The computer system may set in the threshold registers, periods that are integral multiples of or fractions of the response periods of the devices. As a result, the computer system can improve operability for the user. If the response periods are set in the threshold registers, the computer system, at a first alarm, executes a process corresponding to interrupt processing after the response period of the device has been exceeded; and at a second alarm and subsequent alarms, the computer system executes processing within the response period of the device. Concerning the responsiveness of the keyboard, touch panel, etc. for which the guarantee of real-time processing is relatively gradual for the user, even with such control, sufficient effects can be achieved.

The interrupt monitoring method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the recording medium, and executed by the computer. The program may be distributed through a network such as the Internet.

The interrupt monitoring apparatus 102 described in the present embodiment can be realized by an application specific integrated circuit (ASIC) such as a standard cell or a structured ASIC, or a programmable logic device (PLD) such as a field-programmable gate array (FPGA). Specifically, for example, functional units (the storage 301 to the output circuit 304 of the interrupt monitoring apparatus 102 are defined in hardware description language (HDL), which is logically synthesized and applied to the ASIC, the PLD, etc., thereby enabling manufacture of the interrupt monitoring apparatus 102.

According to one aspect of the embodiment, real-time processing can be guaranteed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A computer system comprising:
   a control apparatus configured to control a thread group including one or more threads;
   an interrupt monitoring apparatus configured to communicate with the control apparatus; and
   a device configured to communicate with the control apparatus, wherein the interrupt monitoring apparatus includes:
      a storage configured to store a given threshold that corresponds to an external interrupt notification from the device,
      a measuring circuit configured to measure a time that elapses from a time when the external interrupt notification is received until a time when a dispatch notification is received from the control apparatus,
      a comparing circuit configured to compare the given threshold and the measured time by the measuring circuit, and
      an output circuit configured to output to the control apparatus, a comparison result obtained by the comparing circuit;
   wherein the control apparatus is configured to include:
      a transmitting circuit configured to transmit the dispatch notification to the interrupt monitoring apparatus, when a process under execution by the control apparatus is a first thread among the thread group and is switched to an interrupt handler that causes execution of a second thread that corresponds to the external interrupt notification, and a control circuit configured to control a priority level of the first thread, when the comparison result is received from the interrupt monitoring apparatus, and wherein the given threshold is determined based on a value selected from integral multiples of and a fraction of a response period set for the device.

2. The computer system according to claim 1, wherein the control circuit is configured to lower the priority level of the first thread, when the comparison result received from the interrupt monitoring apparatus indicates that the measured time is greater than the given threshold.

3. The computer system according to claim 1, wherein the control circuit is configured to restore the priority level of the first thread, when the comparison result received from the interrupt monitoring apparatus indicates that the measured time is less than the given threshold.

* * * * *